(12) United States Patent
Tullimalli et al.

(10) Patent No.: US 11,238,067 B2
(45) Date of Patent: Feb. 1, 2022

(54) SYSTEMS, METHODS AND APPARATUS TO CLUSTER AND CLASSIFY INDIVIDUALS IN GROUPS

(71) Applicant: Intel Corporation, Santa Clara, CA (US)

(72) Inventors: Madhuri Tullimalli, Folsom, CA (US); Handeep Kaur, Santa Clara, CA (US); Prashant Lalwani, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 319 days.

(21) Appl. No.: 16/038,031

(22) Filed: Jul. 17, 2018

(65) Prior Publication Data

US 2019/0050475 A1 Feb. 14, 2019

(51) Int. Cl.
```
G06F 16/28       (2019.01)
H04W 4/02        (2018.01)
H04W 4/029       (2018.01)
G01C 21/34       (2006.01)
G05D 1/02        (2020.01)
G06Q 50/30       (2012.01)
G01C 21/36       (2006.01)
```
(52) U.S. Cl.
CPC ....... *G06F 16/285* (2019.01); *G01C 21/3407* (2013.01); *G01C 21/3484* (2013.01); *G01C 21/3697* (2013.01); *G05D 1/021* (2013.01); *G06Q 50/30* (2013.01); *H04W 4/023* (2013.01); *H04W 4/025* (2013.01); *H04W 4/029* (2018.02)

(58) Field of Classification Search
None
See application file for complete search history.

(56) References Cited

U.S. PATENT DOCUMENTS 9,104,537 B1 * 8/2015 Penilla ................. B60L 53/305
2020/0180534 A1 * 6/2020 Kohler ............... G06K 9/00892

OTHER PUBLICATIONS

Castignani, et al., "An Evaluation Study of Driver Profiling Fuzzy Algorithms using Smartphones," paper, 2013, 6 pages, IEEE.
(Continued)

*Primary Examiner* — Thomas G Black
*Assistant Examiner* — Ana D Thomas
(74) *Attorney, Agent, or Firm* — Spectrum IP Law Group LLC

(57) ABSTRACT

The disclosure generally relates to autonomous or semi-autonomous driving vehicles. Specifically, an embodiment of the disclosure relates to occupancy detection algorithm to classify groups of individuals having a relationship to each other in certain environments, for example, inside a vehicle. In an exemplary embodiment, the disclosure provides an apparatus to associate one or more vehicles with one or more occupants, the apparatus including: a processing system to categorize data received from a plurality of external communication devices; a detector module configured to identify a first vehicle data and a first device data from categorized data; a proximity detector configured to communicate with the vehicle detector and the device detector; and a correlation engine to receive proximity estimate and to correlate the first device with a first occupant of the first vehicle.

22 Claims, 10 Drawing Sheets

(56) References Cited

OTHER PUBLICATIONS

Engelbrecht, et al., "A Survey of Smartphone-based Sensing in Vehicles for ITS Applications," paper, Jul. 22, 2015, 22 pages, Institution of Engineering and Technology.
Saiprasert, et al., "Driver Behaviour Profiling using Smartphone Sensory Data in a V2I Environment," conference, Nov. 3-7, 2014, IEEE, Vienna Austria.
Ferreira, et al., "Driver Behavior Profiling: An Investigation with Different Smartphone Sensors and Machine Learning," Internet journal, Apr. 10, 2017, 12 pages, PLOS, retrieved from https://journals.plos.org/plosone/article?id=10.1371/journal.pone.0174959.

* cited by examiner

SYSTEMS, METHODS AND APPARATUS TO CLUSTER AND CLASSIFY INDIVIDUALS IN GROUPS

FIELD

The disclosure generally relates to autonomous or semi-autonomous driving vehicles. Specifically, an embodiment of the disclosure relates to occupancy detection algorithm to classify groups of individuals having a relationship to each other in certain environments, for example, inside a vehicle.

BACKGROUND

Autonomous Driving (AD) vehicles bring a new ecosystem with new requirements on the cloud and the network architecture. By 2020, one AD vehicle will use about 4,000 GB of data per day (vs. 1.5 GB for an average internet user per day). The increased demand creates a data tsunami and the additional data is useful in increasing user satisfaction. Certain data-driven services may avail the customers to higher user satisfaction and reliability. To this end, there is a need to harvest user data to classify user behavior in social settings and to enhance user experiences with providing recommendations tailored to the user's prior experiences.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

In one embodiment, the disclosure is directed to an Occupancy Detection Algorithm (ODA) which repurposes existing technologies (e.g., Google Maps®, Smartphones, vehicle onboard sensory system) to identify clusters (composed of people and/or vehicles) and classifies such clusters accordingly. In another embodiment, the disclosure enables searching and selecting clusters of interest based, for example, on geographies, moving speeds, etc.

Figure 1:
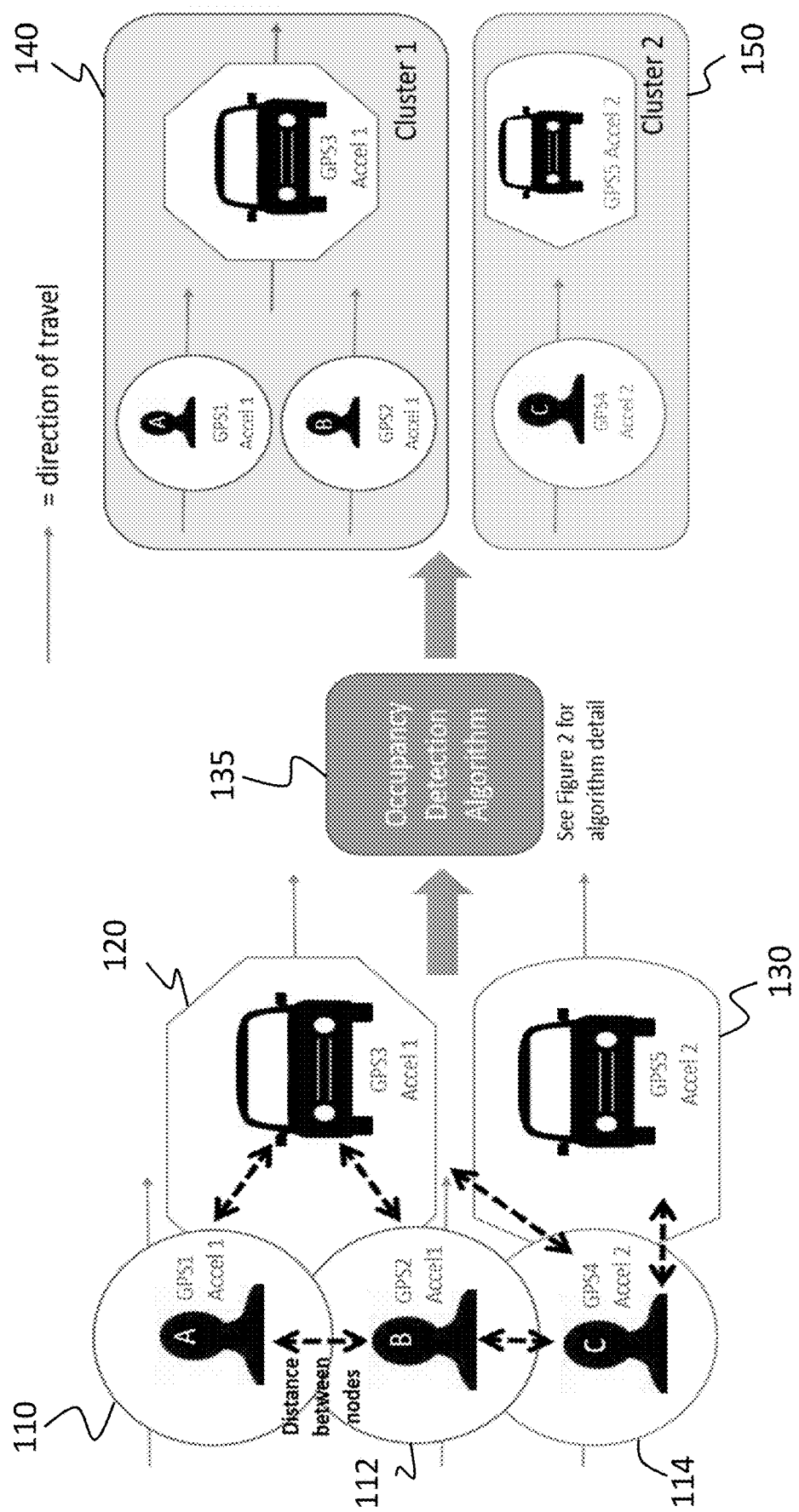
FIG. 1 schematically illustrates an exemplary environment for implementing the disclosed principles.

FIG. 1 schematically illustrates an exemplary environment for implementing the disclosed principles. In FIG. 1, occupants 110 (A) and 112 (B) are in vehicle 120. Occupant A's cell phone may be connected to Google Map® app. GPS (GPS1), revealing location. In addition, an accelerometer is built into occupants A's phone, reveals the specific acceleration, deceleration, speed and direction that occupant A is traveling ("Accel 1"). Similarly, occupant B's cell phone may provide similar data (GPS2, Accel 1). In addition, vehicle 120 is equipped with GPS 3 and may comprise an additional accelerometer.

Second vehicle 130 may be proximal to vehicle 120. Second vehicle 130 may comprise GPS 5, and optionally, an independent accelerometer. Occupant 114 (C) may ride in second vehicle 130. Occupant C may also have a cell phone equipped with GPS 4.

In one embodiment of the disclosure, Occupancy Detection Algorithm 135 can link GPS, accelerometer, and proximity of A and B's phones together to classify that they are indeed traveling in the same vehicle (i.e., vehicle 120) during a set time. The GPS system of vehicle 120 and on board sensors (e.g., GPS 3, Accel 1) are also another node that can be incorporated into the classification to extract occupancy of the vehicle.

More specifically, the occupancy detection algorithm 135 may detect the vehicles navigation system, the number of phones, location, distance from other phones/vehicles, direction of travel, and velocity in order to figure out which occupants are clustered together (and in this case riding together). In an exemplary embodiment, the algorithm may act as a detection engine which can correlate occupants with the vehicle and optionally classify the trip.

The same can be done for clustering individuals in other vehicles. In reference to FIG. 1, occupant 114 (C) may be identified and correlated with vehicle 130. However, proximity of occupant 114 to vehicle 120 may create confusion and thereby cluster occupant 114 with occupants 110 and 120 of vehicle 120. In situations where vehicles are close to one another (e.g., bumper to bumper traffic), accuracy may be further improved by addition of accelerometer data from cell phones mapped to the accelerometer in the vehicle.

In one embodiment of the disclosure, existing applets may be used to identify the source of information stream to determine if the source of data is a cell phone or a vehicle navigation system. For example, a Google® navigation app may identify the source of the information stream to determine if it's a cell phone or a vehicle navigation system.

Another embodiment of the disclosure relates to determining the source of information stream to identify autonomous driving vehicles with no passengers. Here, an AD vehicle may communicate the cloud, edge or other vehicles wirelessly. By identifying that the source of the communication is the vehicle (not passengers) and by determining that there is no secondary signal from associating passenger, the classification engine (or occupancy detection algorithm) may conclude that the source of communication is an AD vehicle without passengers. Similarly, additional information may be gained from one or more applets associated with the vehicle's communication system. For example, Google® may be able to abstract the type of vehicle (AD v. non-AD) based on acceleration rate (e.g., smooth acceleration or erratic start-stop behavior) or whether the vehicle has an electric- or internal combustion engine based on other onboard information.

Figure 2A:
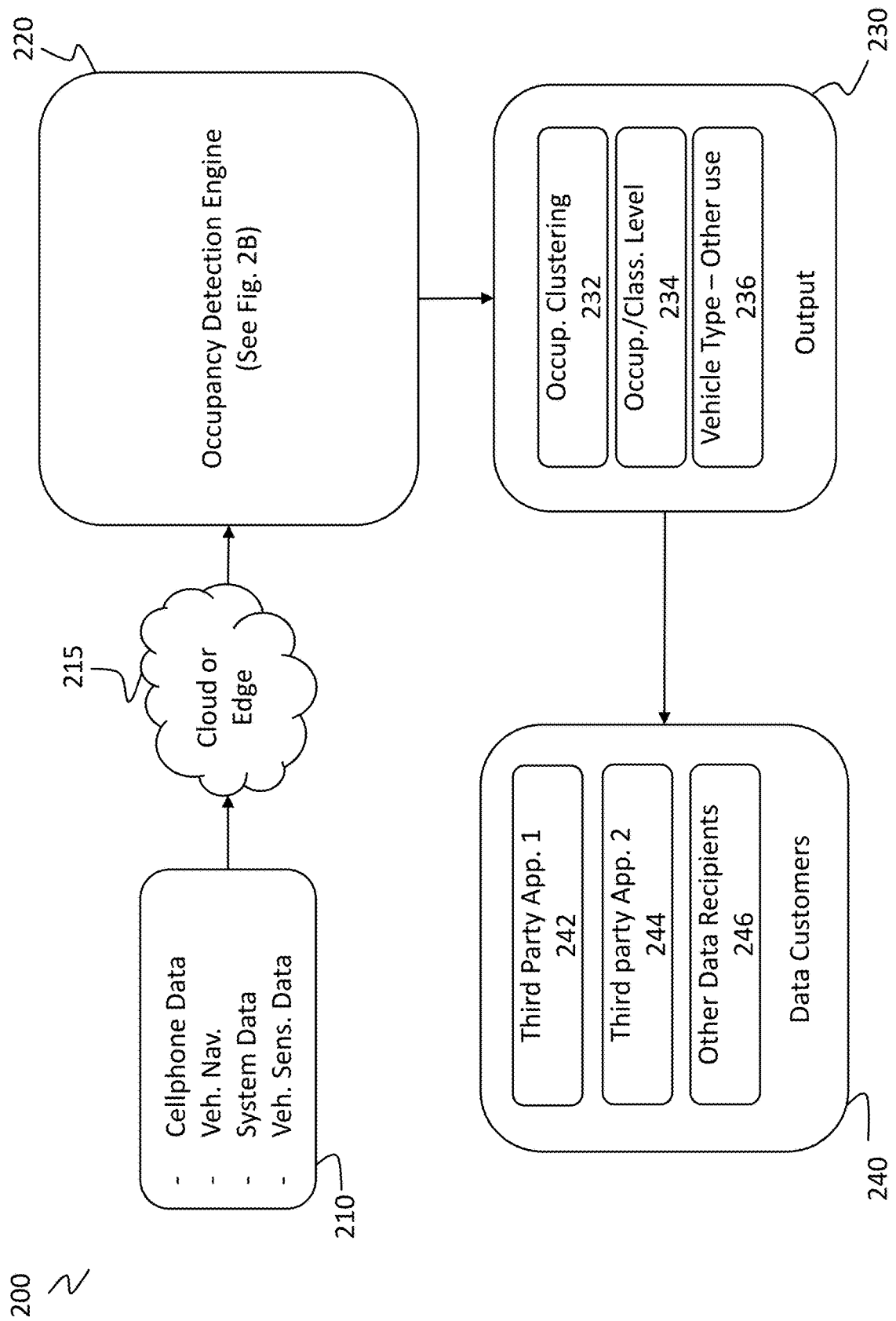
FIG. 2A schematically illustrates an occupancy detection system according to one embodiment of the disclosure.

FIG. 2A schematically illustrates an occupancy detection system according to one embodiment of the disclosure. System 200 of FIG. 2A includes device inputs 210. The device inputs may include data from cell phone, vehicle navigation system, vehicle system data (e.g., data from vehicle Electronic Control Unit (ECU)) and other vehicle sensor data (e.g., ambient light or temperature.) It should be noted that these device inputs are exemplary and non-limiting. Other data inputs from various monitoring devices and/or systems may be included without departing from the disclosed principles. Device data 210 is communicated to the cloud or the network's edge 215. The data is then communicated to occupancy detection engine 220. The occupancy detection engine 220 will be discussed in relation to FIG. 2B. The Output 230 of the occupancy detection engine includes occupancy clustering 232, occupancy classification level 234, vehicle type 236 and other (potential future) uses 236. The output occupancy detection engine 220 is directed to potential data customers. Such customers may include third party applications (e.g., Third Party Apps. 242, 244) as well as other data recipients (e.g., AD vehicle manufacturers, control systems, etc.)

Figure 2B:
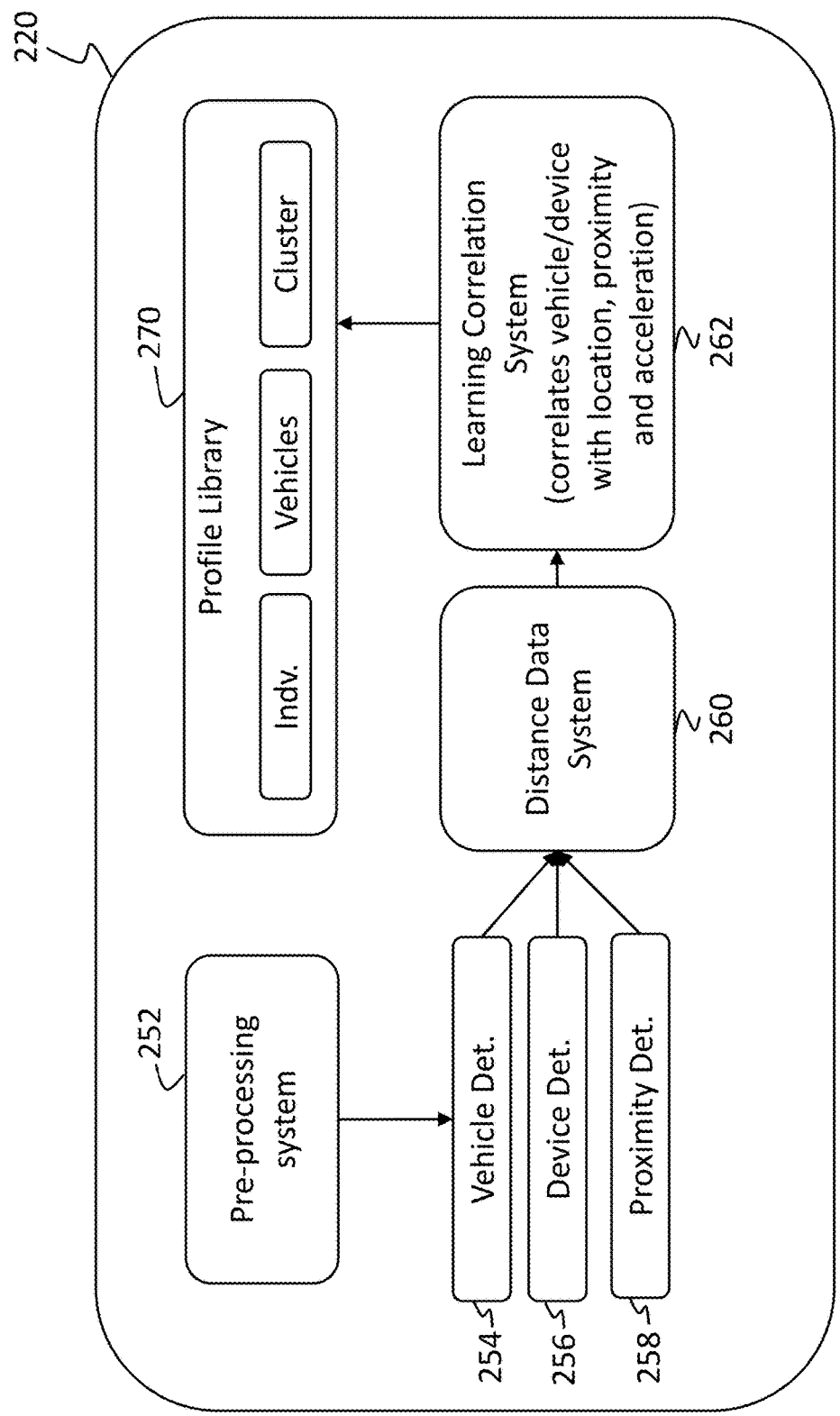
FIG. 2B schematically illustrates an occupancy detection engine according to one embodiment of the disclosure.

FIG. 2B schematically illustrates an occupancy detection engine according to one embodiment of the disclosure. Occupancy engine 220 comprises pre-processing system 252, detection systems (254, 256, 258), distance delta system 260, learning collision system 262 and profile library 270. The occupancy detection engine 220 may be implemented in hardware, software or a combination of hardware and software (e.g., firmware).

In one embodiment, occupancy detection engine 220 may comprise one or more algorithms, executed on processing circuitry. Such algorithms can comprise a machine learning algorithm that can be customized to detect various levels of classification including. Exemplary and non-limiting classification levels may include: occupancy of people traveling in vehicles, occupancy of people on foot in a certain setting (sidewalks, etc.), occupancy of people in varied conditions (night, day, geography, weather conditions, etc.) and driver type (lone driver, family driver, ride sharing service, etc.). Additional customized levels can be created for various implementations and for various needs. For example, classification can be made based on whether the vehicle is driven or is self-driving.

As shown in FIG. 2A, the input to the occupancy detection engine 220 includes device input. The input may comprise cell phone data (access to GPS and phone sensors like accelerometer), vehicle's navigational system and vehicle sensory data. Privacy and security needs can be vigorously protected for implementation of all data and information communicated to occupancy detection engine 220. By way of example, conventional encryption techniques may be used to protect data privacy.

Referring again to FIG. 2B, pre-processing system (interchange, module) 252 receives data from the could or the network edge infrastructure. The data may be device data comprising one or more of cell phone data, vehicle navigation data, vehicle performance data or other system-related data. In one embodiment, pre-processing system 252 collects inputs from devices (cell phones, vehicles, other future sensors) and implements a first level scan to decrease the scope of clustering. For example, the module may set threshold of occupants traveling at a certain speed, identify occupants in specific geographical areas, etc. In one embodiment, pre-processing includes applying filters to the data per customer's request. The customer may be a data aggregator such as Google® and the like. For example, in certain application there may be a need to know the number of vehicles traveling from a starting point (e.g., Sacramento, Calif.) to a destination (e.g., San Francisco, Calif.), using highway US550 W. In an exemplary implementation, the system (e.g., running on the cloud) may sort active devices which are transmitting a GPS location in proximity of Sacramento. Another filter may be added to include acceleration data and to determine if the active devices are moving towards San Francisco. The data may then be mapped to physical coordinates of US550 W to determine the vehicles that are on US550 W toward San Francisco.

Vehicle detection module 254 may be configured to receive information from the vehicle navigation system (not shown). In certain embodiments, vehicle detection module 254 access this information to detect location, direction and travel speed. This information may include vehicle's acceleration and deceleration rates.

Device detection system 256 may be configured to access device (e.g., occupant's cell phone) navigational system to access location, direction and travel speed. This information may include the occupant's (e.g., occupant 110, FIG. 1) acceleration and deceleration rates.

Proximity detection system 258 may use vehicle and device detection system information to deduce proximity between the vehicle and the device(s). This information can determine whether the detected devices are associated as occupants of the vehicle. More specifically, proximity detection module 258 can determine which occupants are associated with which vehicle.

In one embodiment, distance delta system 260 uses vehicle, device, and proximity systems to deduce the distance between the vehicle and the devices. Since each device usually represents a vehicle occupant, distance delta system 260 can determine, among others, how many occupants are associated with a vehicle.

Learning correlation system 262 can be configured for correlating what occupants are correlated (are proximal) to each other. This module may be a machine learning system (e.g., use logistic regression to continuously learn and use methods such as online learning to continually learn from flow of individuals.

Profile library module 270 may be created for individuals, vehicles and clusters of people to learn about their habits. For example, the profile library can be responsible for noting certain patterns that are exhibited when certain clusters travel together. This may be a husband and wife cluster that tends to drive slower, vs when those individuals are clustered with other individuals (as in carpool groups). Behavioral traits can be abstracted out from these learnings. Various situations can also be analyzed to draw conclusions.

For example, who is a driver's most-likely traveling companion; where are the typical destinations according to date or time of travel, etc.

In one implementation, occupancy engine 220 may discern from available information why are these groups of people on the move and why are they clustered in the detected manner. For example, occupancy engine 220 may be enabled to access calendars and other personal information to determine if groups of people have a common goal or destination (e.g., carpool groups that all work for the same employer). Additional relationship between passenger and driver may also be determined based on occupants' identification.

Figure 3B:
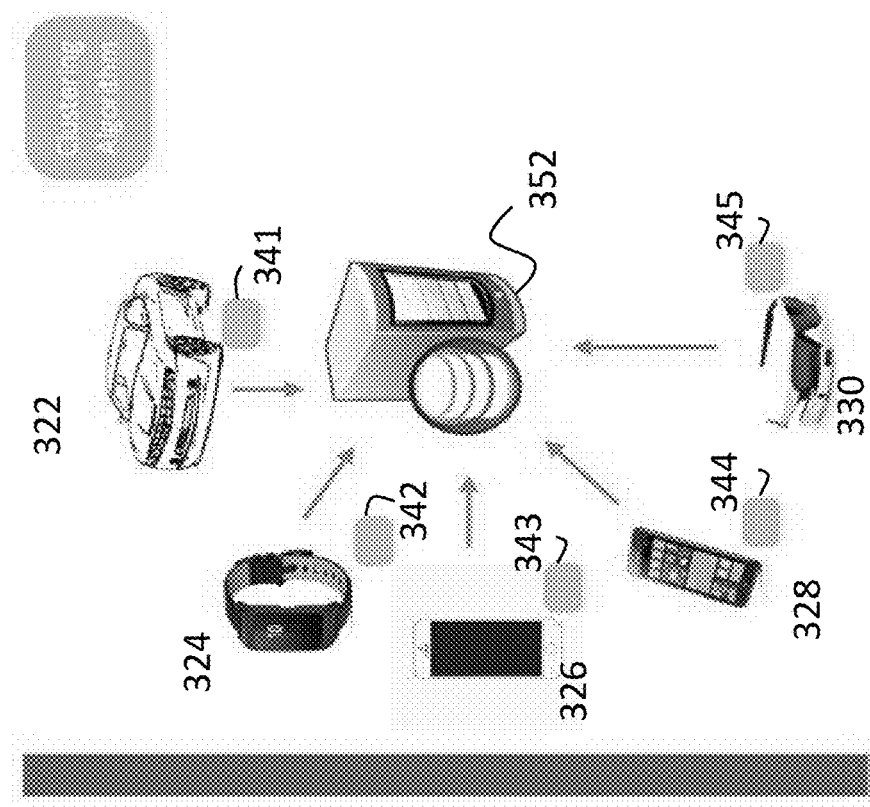
FIG. 3B shows an embodiment of the disclosure where decentralized clustering is done and then transferred to the cloud.
Figure 3A:
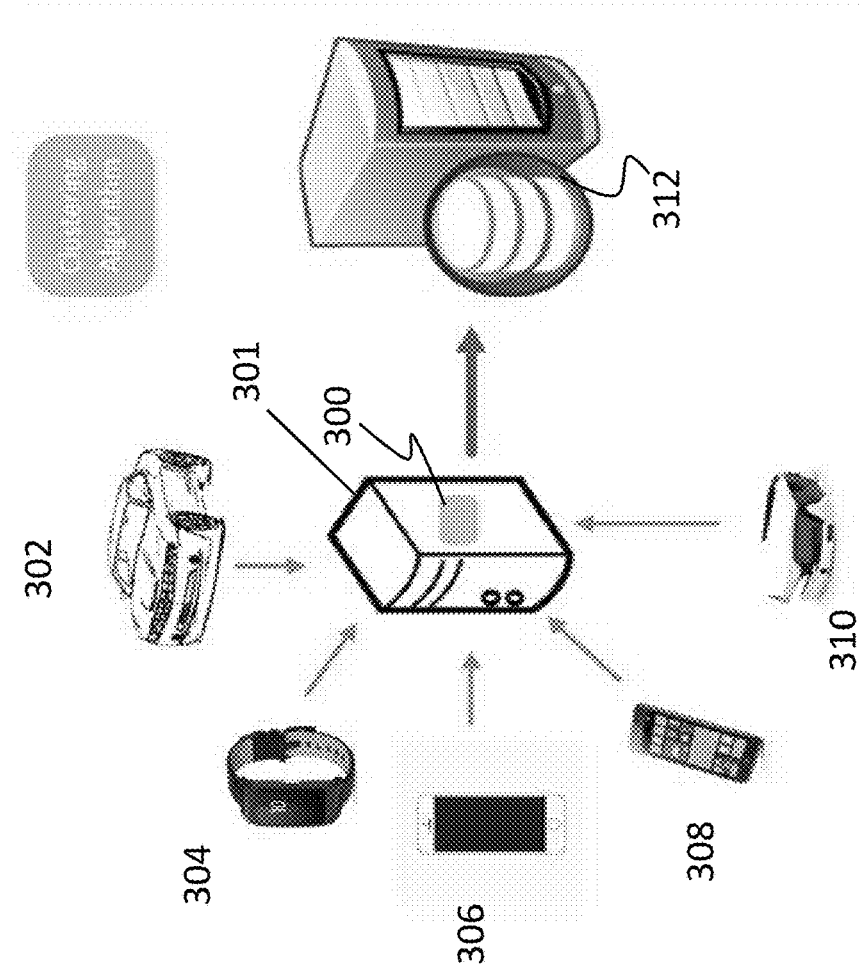
FIG. 3A shows an embodiment of the disclosure where smart devices send data to centralize clustering engine.

FIG. 3A shows an embodiment of the disclosure where smart devices send data to centralize clustering engine. In FIG. 3A, data-providing (or data-sensing) devices include vehicle 302, smart watch 304, smart phones 306, 308 and smart glasses 310. Each of these devices provides data to a server which runs a clustering algorithm (occupancy detection engine 300) as discussed herein. In FIG. A, the clustering algorithm 300 is centralized at server (or CPU) 301. The clustering algorithm's output is then directed to the network infrastructure 312. As discussed, data may be encrypted prior to each transmission.

FIG. 3B shows an embodiment of the disclosure where decentralized clustering is done and then transferred to the cloud. Here, each of the data-sensing devices implements its own clustering function. That is, each device executes its own clustering algorithm to determine proximity to other devices. The data is the sent to network infrastructure 352. To this end, each data-sensing device is shown with its respective clustering algorithm. The clustering algorithm may be implemented at each device separately. Thus, vehicle 322 comprises its respective clustering algorithm 341; smart watch 324 comprises its respective clustering algorithm 342; smart phone 326 comprises its respective clustering algorithm 343; smart phone 328 comprises its respective clustering algorithm 344; and smart glasses 330 comprises its respective clustering algorithm 345. Each device reports directly to network infrastructure 352.

The disclosed principles have many applications, some of which are discussed below. These applications are exemplary and non-limiting.

Behavioral trait detection—The Profile Library is an associative database to show behavioral traits of individuals in different clusters when on the move (or in different situations). Various situations can be analyzed to draw conclusions, like who you're traveling with, your destination, time of the day, etc.

Traffic Management by lane assignment—The Occupancy Detection Algorithm allows for optimal movement of people in vehicles of all SAE levels by providing lane recommendations based on multiple novel input received by the system. When providing you an estimated time of arrival, current services (Google Home, Alexa, navigation systems etc.) do not take into account occupancy or type of vehicle you are driving. These elements can play a drastic role in the lane you take to your destination and your ETA. For example, multi-occupancy and/or electric vehicles in CA can choose to drive in the carpool lane. Discussions are ongoing about creating special lanes for autonomous and electric vehicles.

AD vehicle occupancy status—Identification of occupied and unoccupied vehicles when autonomous cars are made available to market. Autonomous vehicles would be capable of establishing communication with the system and identify themselves as an autonomous vehicle and share its occupancy, or our invention can be used to identify if any occupants are detected or not (assuming that future users of autonomous vehicles will have a smart device, like a cell phone, that can provide GPS information)

Vehicle type identification—Currently in-built navigation systems recognize the vehicle they are part of, but this information isn't articulated to Google Maps. In our invention, this data is shared with our database to identify vehicle type (electric, gas, etc.) Electric vehicles run on motors that give off electromagnetic radiation. This electromagnetic field data ('EMF'—due to presence of motors and batteries) can be collected by using smartphones magnetic sensors as another means of identification (will require more precise sensors in smartphones).

Figure 4:
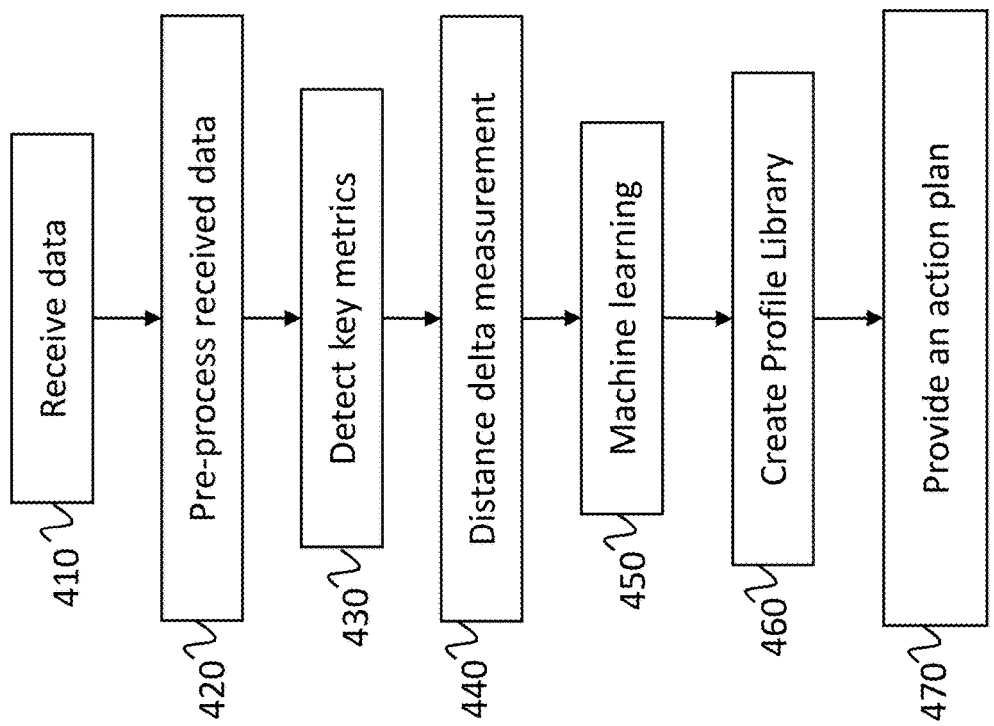
FIG. 4 is an exemplary flow diagram for implementing an occupancy detection algorithm according to one embodiment of the disclosure

FIG. 4 is an exemplary flow diagram for implementing an occupancy detection algorithm according to one embodiment of the disclosure. The flow diagram of FIG. 4 starts at step 410 when the occupancy detection algorithm receives data. The data may be transmitted from a vehicle or from devices having appropriate communication platform(s). At step 420, the received data is pre-processed.

At step 430, key metrics are detected from the processed data. The key metrics may include, direction of travel, acceleration rate, deceleration rate, speed, starting location, current location, etc. In one embodiment, the time interval at the destination and the destination's location are among the metrics considered.

At step 440, the distance delta is measured. In one embodiment, the distance delta uses the data from the vehicle, devices and the proximity systems to determine the distance between the devices and the vehicle. The distance delta can indicate whether the devices are associated with the vehicle occupants. In certain embodiments, distance measurement is done through GPS coordinates of each device and based on GPS accuracy the distance delta may be measured. Where more accuracy is needed, GPS coordinates may be combined with acceleration data to detect change in GPS coordinates.

At step, 450, a machine learning (ML) correlation algorithm may be implemented to determine how (if at all) the occupants are corelated to each other. Here, the machine learning algorithm may consider different attributes to delineate a relationship. For example, online learning can be used to determine if occupants are married or have a particular relationship. In one implementation, if the occupants are deemed to travel to and from a same destination (e.g., an office space), determination can be made that the occupants are coworkers.

At step 460, the ML information may be used to create a profile library. The profile library may be created for individuals, vehicles and cluster of people to learn about their habits. The cluster library may be stored at a memory circuitry (a database) for future reference. Such data base may also be used during step 460 to retrieve information about the users.

At step 470, the obtained information (as well as any retrieved information) is used to provide an action plan. The action plan may be to provide driving instructions, provide travel direction, recommend a subsequent step (e.g., recommend a restaurant in the anticipated route), etc. In an exemplary embodiment, where the vehicle is an AD (or semi-AD) vehicle, the action plan may be to control the AD or semi-AD vehicle's driving and routing.

In certain embodiments, targeted ads may be provided to occupants to places of interest based on each occupant's online profile (and even considering other passengers). For example, an occupant with multiple Instagram postings of beaches with their significant other may receive ads about a famous beach in her direction of travel when she accompanied by her significant other. In another example application. In another exemplary application, a certain drivers' certain drivers ETA based on carpool lane usage and navigation services can be used to determine carpool lane occupancy at any given time on any given highway.

In still another example, navigation routing may be suggested based on autonomously-driven vehicle verses human driven vehicle—autonomous vehicles may take a route with lots of traffic signals and stop signs (assuming similar or better ETA) while human drivers tend to avoid such routes. In yet another example, is the application of the disclosed principles for smart city management where city officials may direct pedestrian traffic before or after major events if they have the visibility into the pedestrian count data on a street on any given time (e.g., dynamically blocking streets or rerouting cars/pedestrians a few minutes before the crowd is expected to arrive at the intersection etc.)

Each of systems and/or modules of FIGS. 2A and 2B may be implemented in hardware, software or a combination of hardware and software. For example, the entirety of occupancy detection engine 220 may be implemented at a system-on-chip (SoC) or a single-die integrated circuit (microprocessor). Such integrated circuits may be combined or integrated with other IC or communication units.

Figure 5:
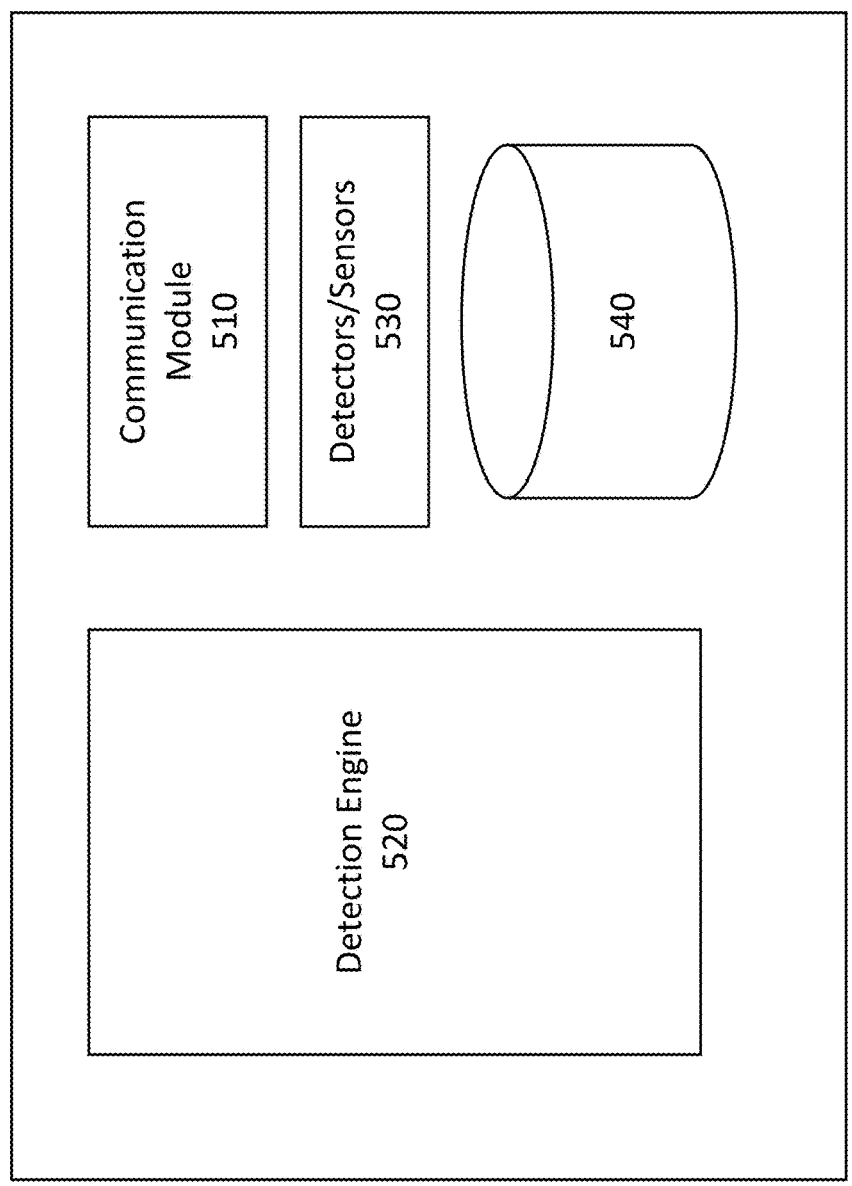
FIG. 5 shows an exemplary apparatus for implementing an embodiment of the disclosure.

FIG. 5 shows an exemplary system for implementing an embodiment of the disclosure. In FIG. 5, system 500 may comprise hardware, software or a combination of hardware and software programmed to implement steps disclosed herein, for example, the steps of flow diagram of FIG. 4. In one embodiment, system 500 may comprise an Artificial Intelligence (AI) CPU. For example, apparatus 500 may be a Machine Learning (ML) algorithm residing at MEC node or a DC node. In one exemplary embodiment, system 500 may be implemented at an AD or semi-AD vehicle. At another exemplary embodiment, system 500 may define an ML node executed external to the vehicle.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

System 500 comprise communication module 510. The communication module may comprise hardware and software configured for landline, wireless and optical communication. For example, communication module 510 may comprise components to conduct wireless communication, including WiFi, 5G, NFC, Bluetooth, Bluetooth Low Energy (BLE) and the like. Detection engine 520 (interchangeably, Controller) may comprise processing circuitry required to implement one or more steps illustrates in FIG. 5. Detection engine 720 may include one or more processor circuitries and memory circuitries. Detection engine 520 may communicate with memory 540. Memory 540 may store one or more tables associated with various threat vectoring. For example, memory 540 may include a table of estimates movement for an adult, a child or an animal. Such information may be retrieved by controller 520 to estimate the likelihood or threat level for a moving object. Moreover, the information in memory 540 may be shared with other AD vehicles or databases.

In certain embodiments, controller 520 may comprise a set of register spaces that record the amount of anticipated resources (to encounter a moving object) and the anticipated response time (latency) for the vehicle. As stated, such determination may vary based on the location of the vehicle and the anticipated threat vectoring.

Detectors and/or sensors module 530 may include one or more detectors and one or more sensors configure to obtain information from the environment proximal to the vehicle. This information may be within the vehicle's FOV. The information may include attributes of objects proximal to the vehicle. Such objects may be moving or stationary. The attributes may include threat identification number, category or the type object (e.g., person, animal, building, etc.), location of the object, speed of the object if the object is moving, direction of movement and the observed or estimated speed of the object. A time stamp and other indicia may also be included in the attribute list.

The detectors may include, for example, LIDAR and RADAR detectors or other such means for detecting objects in the vicinity of the vehicle. Sensors may include one or more sensors configured to receive environmental information proximal to the vehicle. It should be noted that detectors/sensors 530 may be integrated with system 500 or may be independent of system 500. For example, one or more portions of the detectors or sensors may be external to the vehicle. Such sensors may communicate, for example, ambient conditions to the vehicle.

Figure 6:
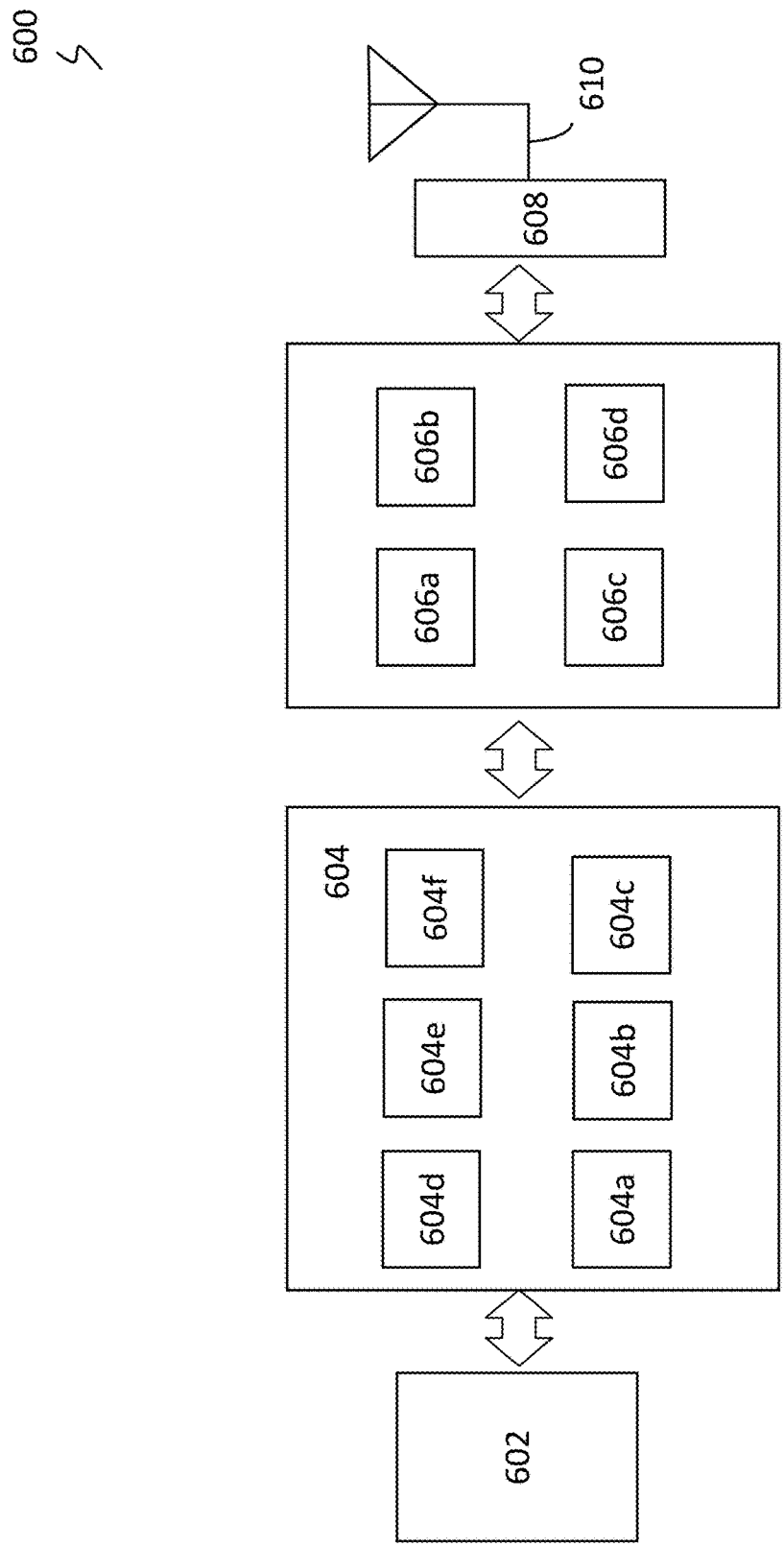
FIG. 6 is a schematic block diagram illustration of components of a communication component in accordance with one or more exemplary embodiments disclosed herein.

FIG. 6 is a schematic block diagram illustration of components of a communication component in accordance with one or more exemplary embodiments disclosed herein. Specifically, FIG. 6 may represent a component of a wireless device as used in the system 500 of FIG. 5. Communication component 600 may be used for landline or wireless communication. Component 600 may include application circuitry 602, baseband circuitry 604, Radio Frequency (RF) circuitry 606, front-end module (FEM) circuitry 608 and one or more antennas 610, coupled together at least as shown.

Application circuitry 602 may include one or more application processors. For example, application circuitry 602 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 604 may include circuitry such as, but not limited to, one or more single-core or multi-core processors. Baseband circuitry 604 may include one or more baseband processors and/or control logic to process baseband signals received from a receive signal path of RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (MG) baseband processor 604a, third generation (3G) baseband processor 604b, fourth generation (4G) baseband processor 604c, and/or one or more other baseband processors 604d for other existing generations, generations in development or to be developed in the future, for example fifth generation (5G), sixth generation (6G), and so on. Baseband circuitry 604, for example one or more of baseband processors 604a through 604d, may handle various radio control functions that enable communication with one or more radio networks via RF circuitry 606. The radio control functions may include, but are not limited to, signal modulation and/or demodulation, encoding and/or decoding, radio frequency shifting, and so on. In some embodiments, modulation and/or demodulation circuitry of baseband circuitry 604 may include Fast-Fourier Transform (FFT), precoding, and/or constellation mapping and/or demapping functionality. In some embodiments, encoding and/or decoding circuitry of baseband circuitry 604 may include convolution, tail-biting convolution, turbo, Viterbi, and/or LowDensity Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or Radio Resource Control (RRC) elements. Processor 604e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 604f. The one or more audio DSPs 604f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 604 and application circuitry 602 may be implemented together such as, for example, on a system on a chip (SOC).

In some embodiments, baseband circuitry 604 may provide for communication compatible with one or more radio technologies. For example, in some embodiments, baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, RF circuitry 606 may include switches, filters, amplifiers, and so on, to facilitate the communication with the wireless network. RF circuitry 606 may include a receive signal path which may include circuitry to down-convert RF signals received from FEM circuitry 608 and provide baseband signals to baseband circuitry 604. RF circuitry 606 may also include a transmit signal path which may include circuitry to up-convert baseband signals provided by the baseband circuitry 604 and provide RF output signals to FEM circuitry 608 for transmission.

In some embodiments, RF circuitry 606 may include a receive signal path and a transmit signal path. The receive signal path of RF circuitry 606 may include mixer circuitry 606a, amplifier circuitry 606b and filter circuitry 606c. The transmit signal path of RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from FEM circuitry 608 based on the synthesized frequency provided by synthesizer circuitry 606d. Amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, mixer circuitry 606a of the transmit signal path may be configured to up-convert input baseband signals based on the synthesized frequency provided by synthesizer circuitry 606d to generate RF output signals for FEM circuitry 608. The baseband signals may be provided by the baseband circuitry 604 and may be filtered by filter circuitry 606c. Filter circuitry 606c may include a low-pass filter (LPF), although the scope of the embodiments is not limited in this respect.

In some embodiments, mixer circuitry 606a of the receive signal path and the mixer circuitry 606a of the transmit signal path may include two or more mixers and may be arranged for quadrature down conversion and/or up conversion respectively. In some embodiments, mixer circuitry 606a of the receive signal path and the mixer circuitry 606a of the transmit signal path may include two or more mixers and may be arranged for image rejection, for example Hartley image rejection. In some embodiments, mixer circuitry 606a of the receive signal path and the mixer circuitry 606a may be arranged for direct down conversion and/or direct up conversion, respectively. In some embodiments, mixer circuitry 606a of the receive signal path and mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 606 may include analog-to-digital converter (ADC) and digital-to-analog converter (DAC) circuitry, and baseband circuitry 604 may include a digital baseband interface to communicate with RF circuitry 606. In some dual-mode embodiments, separate radio integrated circuit (IC) circuitry may be provided for processing signals for one or more spectra, although the scope of the embodiments is not limited in this respect.

In some embodiments, synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606*d* may be a delta-sigma synthesizer, a frequency multiplier, or a synthesizer comprising a phase-locked loop with a frequency divider.

Synthesizer circuitry 606*d* may be configured to synthesize an output frequency for use by mixer circuitry 606*a* of RF circuitry 606 based on a frequency input and a divider control input. In some embodiments, synthesizer circuitry 606*d* may be a fractional N/N+1 synthesizer.

In some embodiments, frequency input may be provided by a voltage controlled oscillator (VCO), although that is not a requirement. Divider control input may be provided by either baseband circuitry 604 or applications processor 602 depending on the desired output frequency. In some embodiments, a divider control input (e.g., N) may be determined from a look-up table based on a channel indicated by applications processor 602.

Synthesizer circuitry 606*d* of RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by RF circuitry 606 for transmission by one or more of the one or more antennas 610.

In some embodiments, FEM circuitry 608 may include a transmit/receive (TX/RX) switch to switch between transmit mode and receive mode operation. FEM circuitry 608 may include a receive signal path and a transmit signal path. The receive signal path of FEM circuitry 608 may include a low-noise amplifier (LNA) to amplify received RF signals and to provide the amplified received RF signals as an output, for example to RF circuitry 606. The transmit signal path of FEM circuitry 608 may include a power amplifier (PA) to amplify input RF signals, for example provided by RF circuitry 606, and one or more filters to generate RF signals for subsequent transmission, for example by one or more of antennas 610. In some embodiments, UE device 600 may include additional elements such as, for example, memory and/or storage, display, camera, sensor, and/or input/output (I/O) interface, although the scope of the claimed subject matter is not limited in this respect.

Furthermore, some embodiments may be applied in computing devices that include one or more processors (e.g., with one or more processor cores), such as those discussed with reference to disclosed FIGS. herein, including for example, small form factor or mobile computing devices, e.g., an IoT device, M2M device, a smartphone, tablet, UMPC (Ultra-Mobile Personal Computer), laptop computer, Ultrabook™ computing device, wearable devices (such as a smart watch, smart glasses, etc.), 2 in 1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

In some embodiments, an IoT device may be utilized. An IoT device may include various components (such as one or more components discussed with reference to the disclosed figures). Also, one or more embodiments may utilize a computing cloud (or more generally a "cloud"). The computing cloud may include various types of computing devices. These devices may be in digital communication via a cellular communication channel, a computer network, and/or the Internet. Also, one or more of the components discussed herein can be embodied as a System-On-Chip (SOC) device.

Figure 7:
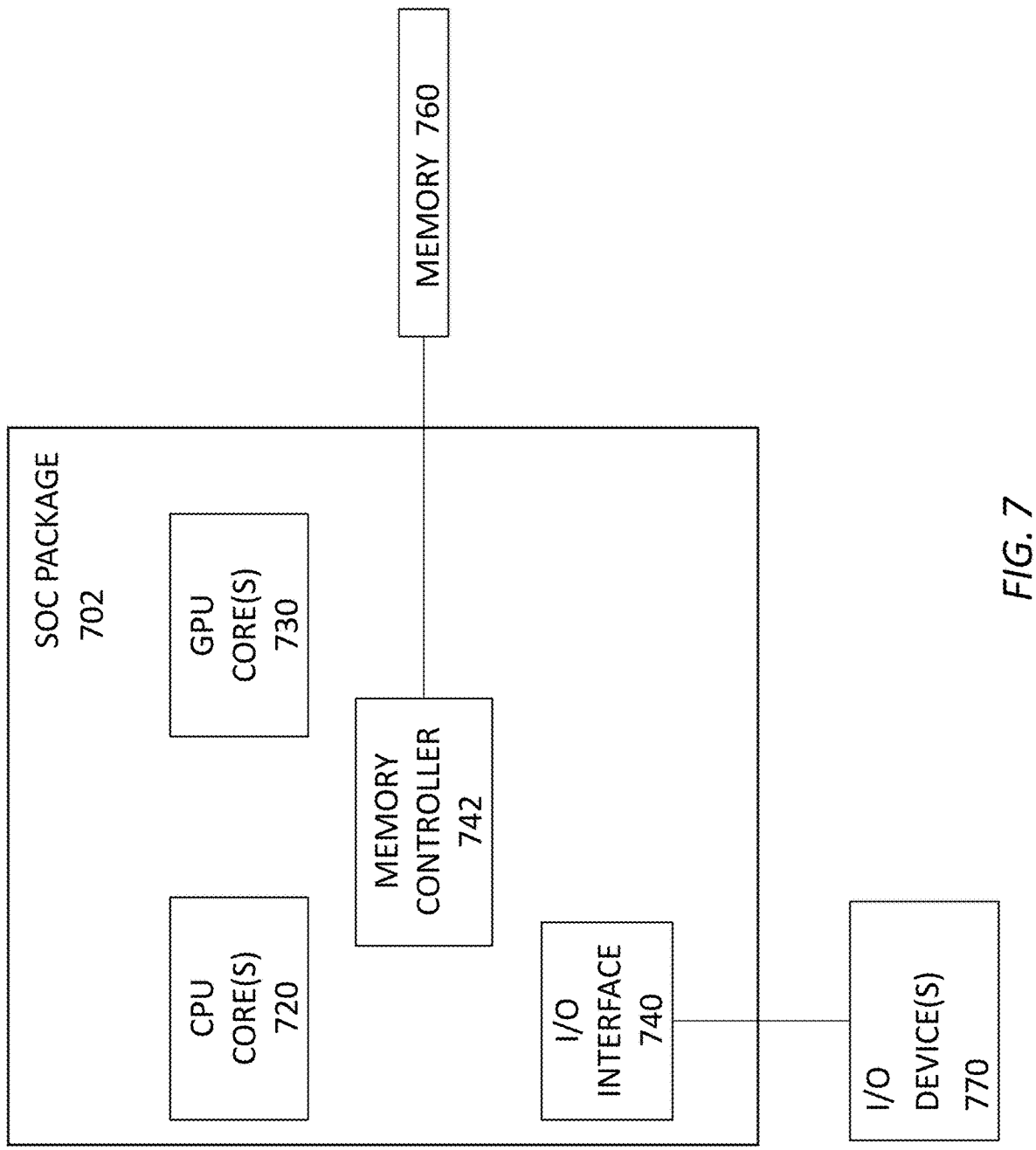
FIG. 7 illustrates a block diagram of an SOC package in accordance with an embodiment.

FIG. 7 illustrates a block diagram of an SOC package in accordance with an embodiment. As illustrated in FIG. 7, SOC 802 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
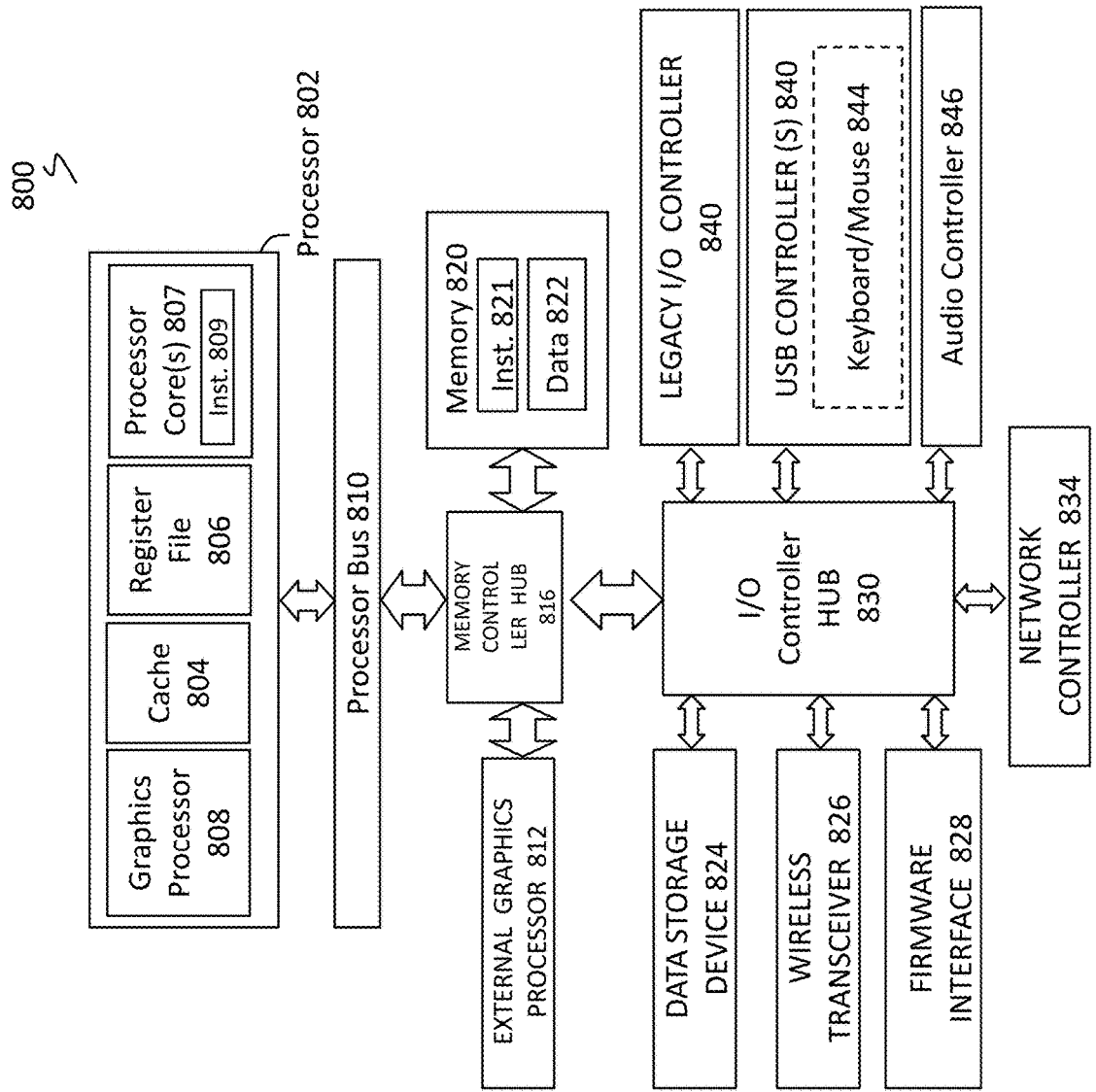
FIG. 8 is a block diagram of a processing system 1000, according to an embodiment of the disclosure.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 88 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 88. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9B:
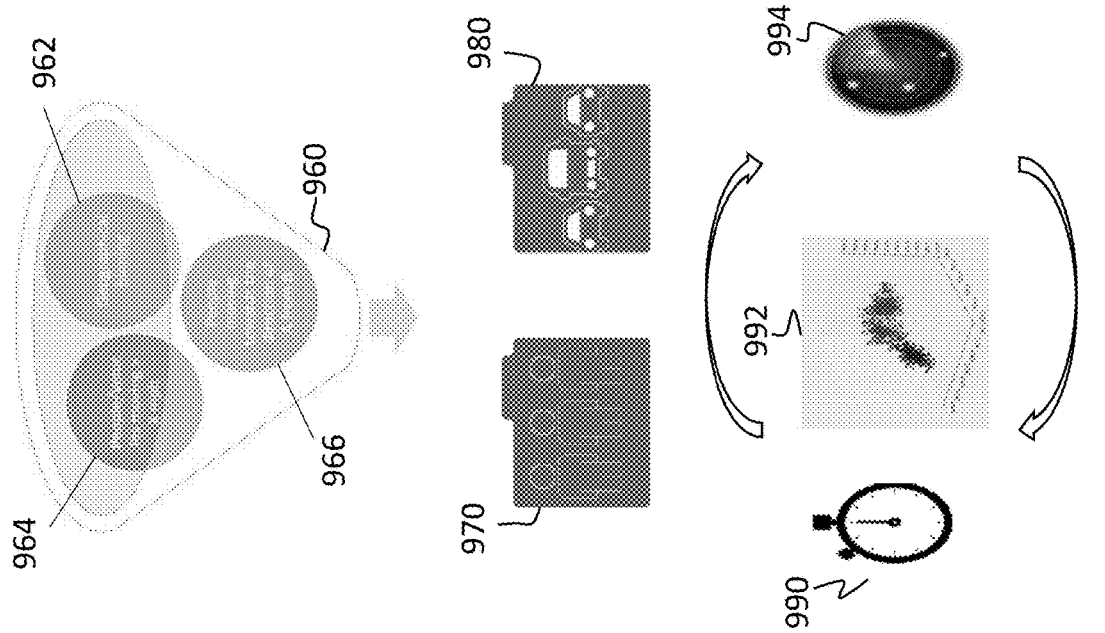
FIG. 9B shows an embodiment of the disclosure for processing information.
Figure 9A:
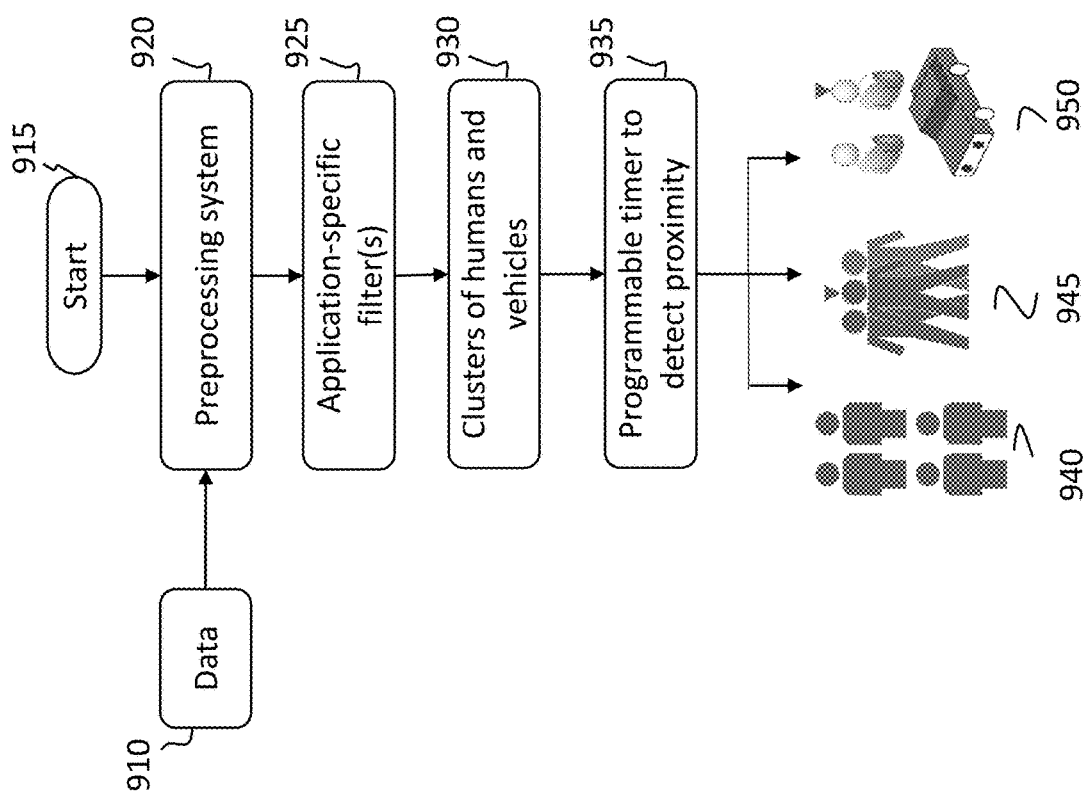
FIG. 9A is an exemplary flow diagram according to another embodiment of the disclosure.

FIG. 9A is an exemplary flow diagram according to another embodiment of the disclosure. The process of FIG. 9A starts at step 915. At step 910 data is obtained. Data may be cellphone data, vehicle navigation system data, vehicle sensor data and smart device data. At step 920, the pre-processing system receives and processes the data as described above.

At step 925, application-specific filters are applied to the pre-processed data is filtered. In an exemplary application, the filters may identify, occupants of a vehicle that regularly travel from Sacramento to San Francisco. At step 930, the clusters of humans/vehicles is formed. At step 935, a programmable timer is used to detect proximity between vehicles and occupants. For example, a time window can be used to correlate vehicles to its occupants. At steps 940, 945 and 950. For example, four occupants (940) may be correlated together as regular passengers at a given route and/or during at a given travel time. In another example, other characteristic indicia 945 (e.g., male/female or driver/passenger) may be determined from available data. In still another example, the driver/passenger relationship 950 may be determined from available signal information.

FIG. 9B shows an embodiment of the disclosure for processing information. In FIG. 9B, information is processed by binning through filter 960. Data may be binned 962 based on geographical information. In another example, data may be binned as a function of people (occupants), vehicles that are moving higher than a threshold speed. In still another example, data may be binned as a function of travel direction (e.g., people and/or vehicles moving from point A to point B.

At steps 970 and 980, binned information 960 is categorized in appropriate files. At steps 990, 992 and 994, the information is used to plot the time of travel, location of travel, etc.

ADDITIONAL NOTES & EXAMPLES

The following examples are presented to further illustrate non-limiting embodiments of the disclosure. Example 1 is directed to an apparatus to associate one or more vehicles with one or more occupants of the vehicles, the apparatus comprising: a processing system to categorize data received from a plurality of external communication devices, wherein external devices comprise one or more vehicles and one or more smart devices; a detector module configured to identify a first vehicle data and a first device data from categorized data, the first vehicle data including one or more of location, direction and travel speed of a first vehicle, the first device data including one or more of location, direction and travel speed of a first device; a proximity detector configured to communicate with the vehicle detector and the device detector, the proximity detector configured to estimate proximity between the first vehicle and the first device; and a correlation engine to receive proximity estimate and to correlate the first device with a first occupant of the first vehicle; a profile library to store information correlating the first device, the first vehicle, vehicle data and device data.

Example 2 is directed to the apparatus of Example 1, wherein the detector module further comprises a vehicle detector module and a device detector module.

Example 3 is directed to the apparatus of Example 2, wherein the vehicle detector module is configured to identify vehicle data from categorized data, the vehicle data including one or more of vehicle location, travel speed and direction, acceleration/deceleration for the first vehicle.

Example 4 is directed to the apparatus of Example 2, wherein the device detector module is configured to identify device data from categorized data, the device data including one or more of device location, travel speed and direction, acceleration/deceleration for the first device.

Example 5 is directed to the apparatus of Example 1, wherein the detector module is further configured to identify a second vehicle data and a second device data from categorized data, the second vehicle data including one or more of location, direction and travel speed of a second vehicle, the second device data including one or more of location, direction and travel speed of a second device.

Example 6 is directed to the apparatus of Example 5, wherein the correlation engine is further configured to correlate the first device with a first occupant and the second device with a second occupant of the first vehicle.

Example 7 is directed to the apparatus of Example 5, wherein the correlation engine is further configured to correlate the first device with a first occupant of the first vehicle and to correlate the second device with a second occupant of the second vehicle.

Example 8 is directed to at least one machine-readable medium including instructions to correlate one or more occupants with one more respective vehicles, which when executed, cause one or more processors to implement steps comprising: categorize data received from a plurality of external communication devices, wherein external devices comprise one or more vehicles and one or more smart devices; identify a first vehicle data and a first device data from categorized data, the first vehicle data including one or more of location, direction and travel speed of a first vehicle, the first device data including one or more of location, direction and travel speed of a first device; communicate with the vehicle detector and the device detector and estimate proximity between the first vehicle and the first device; and correlate the first device with a first occupant of the first vehicle.

Example 9 is directed to the medium of Example 8, wherein the instructions further cause the one or more processors to store information correlating the first device, the first vehicle, vehicle data and device data at a memory.

Example 10 is directed to the medium of Example 8, wherein the instructions further cause the one or more processors to identify a second vehicle data and a second device data from categorized data, the second vehicle data including one or more of location, direction and travel speed of a second vehicle, the second device data including one or more of location, direction and travel speed of a second device.

Example 11 is directed to the medium of Example 10, wherein the instructions further cause the one or more processors to correlate the first device with a first occupant and the second device with a second occupant of the first vehicle.

Example 12 is directed to the medium of Example 10, wherein the instructions further cause the one or more processors to correlate the first device with a first occupant of the first vehicle and to correlate the second device with a second occupant of the second vehicle.

Example 13 is directed to the medium of Example 10, wherein the instructions further cause the one or more processors to report the correlation data between one or more of the first vehicle, the second vehicle, the first occupant, and the second occupant to a network infrastructure.

Example 14 is directed to the medium of Example 10, wherein the instructions further cause the one or more processors to engage driving or routing of the first vehicle according to the identified occupant's known preferences.

Example 15 is directed to the medium of Example 10, wherein the instructions further cause the one or more processors to store a correlated relationship between the first occupant and the second occupant.

Example 16 is directed to a system to associate one or more vehicles with one or more occupants of the vehicles, the system comprising: a communication module to receive data from a plurality of external communication devices, wherein external devices comprise one or more vehicles and one or more smart devices; a detection engine configured to identify a first vehicle data and a first device data from the received data, the first vehicle data including one or more of location, direction and travel speed of a first vehicle, the first device data including one or more of location, direction and travel speed of a first device, the detection engine further configured to identify a relationship between the first device and a first vehicle as a function of one or more of the first vehicle data and a first device data.

Example 17 is directed to the system of Example 16, wherein the detection engine further comprises a vehicle detector module and a device detector module.

Example 18 is directed to the system of Example 17, wherein the vehicle detector module is configured to identify vehicle data from the received data, the vehicle data including one or more of vehicle location, travel speed and direction, acceleration/deceleration for the first vehicle.

Example 19 is directed to the system of Example 17, wherein the device detector module is configured to identify device data from categorized data, the device data including one or more of device location, travel speed and direction, acceleration/deceleration for the first device.

Example 20 is directed to the system of Example 16, wherein the detector module is further configured to identify a second vehicle data and a second device data from categorized data, the second vehicle data including one or more of location, direction and travel speed of a second vehicle, the second device data including one or more of location, direction and travel speed of a second device.

Example 21 is directed to the system of Example 20, wherein the correlation engine is further configured to correlate the first device with a first occupant and the second device with a second occupant of the first vehicle.

Example 22 is directed to the system of Example 20, wherein the correlation engine is further configured to correlate the first device with a first occupant of the first vehicle and to correlate the second device with a second occupant of the second vehicle.

While the principles of the disclosure have been illustrated in relation to the exemplary embodiments shown herein, the principles of the disclosure are not limited thereto and include any modification, variation or permutation thereof.

What is claimed is:

1. An apparatus to associate one or more vehicles with one or more occupants of the vehicles from among a cluster of vehicles traveling simultaneously at a similar direction, the apparatus comprising:
   a processing system to categorize data received from a plurality of external communication devices, wherein external devices comprise one or more vehicles and one or more smart devices associated with the one or more occupants of the vehicles;
   a detector configured to identify a first vehicle data and a first device data from categorized data, the first vehicle data including one or more of location, direction and travel speed of a first vehicle, the first device data including one or more of location, direction and travel speed of a first device;
   a proximity detector configured to communicate with the detector and the processing system, the proximity detector configured to estimate proximity between the first vehicle and the first device;
   a correlation engine to receive proximity estimate and to correlate the first device with a first occupant of the first vehicle from among the one or more occupants of the first vehicle; and
   a profile library to store information correlating the first device, the first vehicle, vehicle data and device data.

2. The apparatus of claim 1, wherein the detector further comprises a vehicle detector and a device detector.

3. The apparatus of claim 2, wherein the vehicle detector is configured to identify vehicle data from categorized data, the vehicle data including one or more of vehicle location, travel speed and direction, acceleration/deceleration for the first vehicle.

4. The apparatus of claim 2, wherein the device detector is configured to identify device data from categorized data, the device data including one or more of device location, travel speed and direction, acceleration/deceleration for the first device.

5. The apparatus of claim 1, wherein the detector is further configured to identify a second vehicle data and a second device data from categorized data, the second vehicle data including one or more of location, direction and travel speed of a second vehicle, the second device data including one or more of location, direction and travel speed of a second device.

6. The apparatus of claim 5, wherein the correlation engine is further configured to correlate the first device with a first occupant and the second device with a second occupant of the first vehicle.

7. The apparatus of claim 5, wherein the correlation engine is further configured to correlate the first device with a first occupant of the first vehicle and to correlate the second device with a second occupant of the second vehicle.

8. At least one non-transitory machine-readable medium including instructions to correlate one or more occupants with one more respective vehicles from among a cluster of vehicles traveling simultaneously at a similar direction, which when executed, cause one or more processors to implement steps comprising:
   categorize data received from a plurality of external communication devices, wherein external devices comprise one or more vehicles and one or more smart devices associated with the one or more occupants of the vehicles;
   identify a first vehicle data and a first device data from categorized data, the first vehicle data including one or more of location, direction and travel speed of a first vehicle, the first device data including one or more of location, direction and travel speed of a first device;
   communicate with the vehicle detector and the device detector and estimate a proximity distance between the first vehicle and the first device; and
   correlate the first device from among the one or more occupants of the first vehicle with a first occupant of the first vehicle.

9. The medium of claim 8, wherein the instructions further cause the one or more processors to store information correlating the first device, the first vehicle, vehicle data and device data at a memory.

10. The medium of claim 8, wherein the instructions further cause the one or more processors to identify a second vehicle data and a second device data from categorized data, the second vehicle data including one or more of location, direction and travel speed of a second vehicle, the second device data including one or more of location, direction and travel speed of a second device, the second vehicle data including one or more of location, direction and travel speed of a second vehicle, the second device data including one or more of location, direction and travel speed of a second device.

11. The medium of claim 10, wherein the instructions further cause the one or more processors to correlate the first device with a first occupant and the second device with a second occupant of the first vehicle.

12. The medium of claim 10, wherein the instructions further cause the one or more processors to correlate the first device with a first occupant of the first vehicle and to correlate the second device with a second occupant of the second vehicle.

13. The medium of claim 10, wherein the instructions further cause the one or more processors to report the correlation data between one or more of the first vehicle, the second vehicle, the first occupant, and the second occupant to a network infrastructure.

14. The medium of claim 10, wherein the instructions further cause the one or more processors to engage driving or routing of the first vehicle according to the identified occupant's known preferences.

15. The medium of claim 10, wherein the instructions further cause the one or more processors to store a correlated relationship between the first occupant and the second occupant.

16. A system to associate one or more vehicles with one or more occupants of the vehicles from among a cluster of vehicles traveling at simultaneously at a similar direction, the system comprising:
   a communication module to receive data from a plurality of external communication devices, wherein external devices comprise one or more vehicles and one or more smart devices associated with the one or more occupants of the vehicles;
   a detector configured to identify a first vehicle data and a first device data from the received data, the first vehicle data including one or more of location, direction and travel speed of a first vehicle, the first device data including one or more of location, direction and travel speed of a first device, the detector further configured to identify a relationship between the first device and a first vehicle as a function of one or more of the first vehicle data and a first device data;
   wherein the detection engine is further configured to correlate the first device from among the one or more occupants of the vehicle.

17. The system of claim 16, wherein the detector further comprises a vehicle detector and a device detector.

18. The system of claim 17, wherein the vehicle detector is configured to identify vehicle data from the received data, the vehicle data including one or more of vehicle location, travel speed and direction, acceleration/deceleration for the first vehicle.

19. The system of claim 17, wherein the device detector is configured to identify device data from categorized data, the device data including one or more of device location, travel speed and direction, acceleration/deceleration for the first device.

20. The system of claim 16, wherein the detector module is further configured to identify a second vehicle data and a second device data from categorized data, the second vehicle data including one or more of location, direction and travel speed of a second vehicle, the second device data including one or more of location, direction and travel speed of a second device.

21. The system of claim 20, wherein the correlation engine is further configured to correlate the first device with a first occupant and the second device with a second occupant of the first vehicle.

22. The system of claim 20, wherein the correlation engine is further configured to correlate the first device with a first occupant of the first vehicle and to correlate the second device with a second occupant of the second vehicle.

* * * * *